United States Patent [19]

Addison

[11] Patent Number: 4,491,420

[45] Date of Patent: Jan. 1, 1985

[54] APPARATUS FOR MIXING SYRUP WITH FEED

[76] Inventor: Cern A. Addison, Rte. 3, Box 293, Franklinton, La. 70438

[21] Appl. No.: 528,809

[22] Filed: Sep. 2, 1983

[51] Int. Cl.³ .......................................... A23N 17/00
[52] U.S. Cl. ..................................... 366/156; 99/534; 366/177; 366/186; 366/325; 366/603
[58] Field of Search ...................... 366/79, 156, 83-86, 366/167, 168, 172, 177, 186, 279, 292, 293, 297, 299, 325, 326, 329, 603; 241/30, 101 B, 101.7; 99/467, 471, 477, 516, 534

[56] References Cited

U.S. PATENT DOCUMENTS

| | | | |
|---|---|---|---|
| 2,281,974 | 5/1942 | Herr | 366/603 X |
| 2,800,238 | 7/1957 | Oliver | 366/603 X |
| 2,806,678 | 9/1957 | Stevens et al. | |
| 3,051,454 | 8/1962 | Goos et al. | |
| 3,133,727 | 5/1964 | Luscombe | |
| 3,185,449 | 5/1965 | Kasten | |
| 3,346,240 | 10/1967 | Lavelle et al. | |
| 3,635,901 | 1/1972 | Urgesi et al. | 366/325 X |
| 3,946,996 | 3/1976 | Gergely | 366/325 X |
| 4,125,063 | 11/1978 | Jelks | |
| 4,298,289 | 11/1981 | Walley | 366/603 X |

*Primary Examiner*—Timothy F. Simone
*Attorney, Agent, or Firm*—David L. Ray

[57] ABSTRACT

An apparatus for mixing particulate livestock feed with a viscous fluid such as syrup, the apparatus including a drum for receiving feed, "U-shaped mixing blades contained in the drum and mounted on a rotatable shaft for agitating and mixing the feed, a fluid pump for pumping syrup into the mixing drum, an outlet connected to the mixing drum at the end opposite the inlet of the livestock feed to the mixing drum, and an auger conveyer located beneath said outlet for conveying the mixture of feed and fluid to a desired location, the apparatus being inclined at an acute angle with the horizontal to position the outlet of the mixing drum at a height lower than the inlet.

9 Claims, 4 Drawing Figures

APPARATUS FOR MIXING SYRUP WITH FEED

BACKGROUND OF THE INVENTION

1. Field of the Invention

This invention relates to a mixing apparatus. In particular, the present invention relates to an apparatus for mixing feed for animals with a fluid such as syrup.

2. Description of the Prior Art

Many devices are disclosed in the prior art for mixing various particulate materials used for animal feed with fluids which improve the qualities of the feed with which they are mixed. There are also numerous devices disclosed in the prior art which show the mixing of various feed components to produce a blend of components which is preferably uniform in composition. Exemplary of such patents are the following:

U.S. Pat. No. 2,806,678 discloses a blender for mixing molasses and the like with dry feed such as ground grain and hay. The blender has a central shaft 32 having a series of radially extending, individual arms thereon.

U.S. Pat. No. 3,051,454 discloses a mixing apparatus for intermixing a solid in particulate form with a fluid to form a moldable product. The mixer may be continuously operated, mixing fluids, such as liquids or paste with solids at a relatively low power output. Exemplary products mixed are charcoal with starch paste. The apparatus includes a pair of scraper blades 31 and mixing blades 29 which are mounted on a vertical shaft in a mixing chamber which contains, in addition, two concave discs 16 and 17 for agitating and mixing the liquids and paste therein.

U.S. Pat. No. 3,185,449 discloses a feed mixer and cooperating screw conveyers for vertically lifting the feed to be mixed within a mixing tank. The device shows a series of screw conveyers for mixing feed in a bin but has no provision for mixing liquids or fluids with the feed.

U.S. Pat. No. 3,346,240 discloses a mixing apparatus for continuously mixing dry, powdered, or granulated materials and liquids. Such a mixing apparatus is used in batchmixing products such as pancake batter, dough, or the like. The apparatus has three chambers and a rotatable shaft extending through all three chambers.

U.S. Pat. No. 4,125,063 discloses an apparatus for the continuous treatment of cellulosic material such as straw, rice, hulls and bagasse to increase the digestability by livestock such as cattle, horses, sheep, goats and swine by chemically treating the cellulosic material and subjecting the material to steam. The apparatus includes a first mill wherein the steamed cellulosic matter and process chemicals are intimately mixed and initially reacted, a second stage where a reactor with sweeps completes the reaction, and a second mill wherein the reacted material is neutralized to the desired level. A central shaft extends through the reaction chamber and has a plurality of longitudinally spaced radially extending arm sweeps secured thereto. The axis of the shaft on which the radially extending arms are mounted is vertical to the surface on which the machine is mounted.

It is an object of the present invention to provide an improved, compact, low cost blender for mixing particulate livestock feed with viscous fluids such as syrup and molasses.

SUMMARY OF THE INVENTION

In accordance with the present invention there is provided an apparatus for mixing particulate livestock feed with a viscous fluid such as syrup, the apparatus including a drum for receiving feed, "U"-shaped mixing blades contained in the drum and mounted on a rotatable shaft for agitating and mixing the feed, a fluid pump for pumping syrup into the mixing drum, an outlet connected to the mixing drum at the end opposite the inlet of the livestock feed to the mixing drum, and an auger conveyer located beneath said outlet for conveying the mixture of feed and fluid to a desired location, the apparatus being inclined at an acute angle with the horizontal to position the outlet of the mixing drum at a height lower than the inlet.

One of the advantages of the apparatus of the invention is that is will not easily jam or become clogged with syrup and feed while mixing. Furthermore, the apparatus is relatively inexpensive to manufacture and is relatively light in weight and small in size.

The mixing apparatus of the invention efficiently mixes particulate livestock feed such as grain and the like with viscous fluids such as syrup and molasses to enhance the nutritional value of the feed, reduce grain dust associated with the feed, and to make the feed more palatable to the livestock. The mixing apparatus is particularly useful in receiving grain from one large bin, mixing the grain with syrup, and conveying the treated grain to an adjacent bin for storage. The apparatus can utilize the existing auger on conventional grain bins for receiving grain, and it has an outlet auger incorporated therein to convey and discharge treated grain to an adjacent bin.

DESCRIPTION OF THE PREFERRED EMBODIMENT

Figure 1:
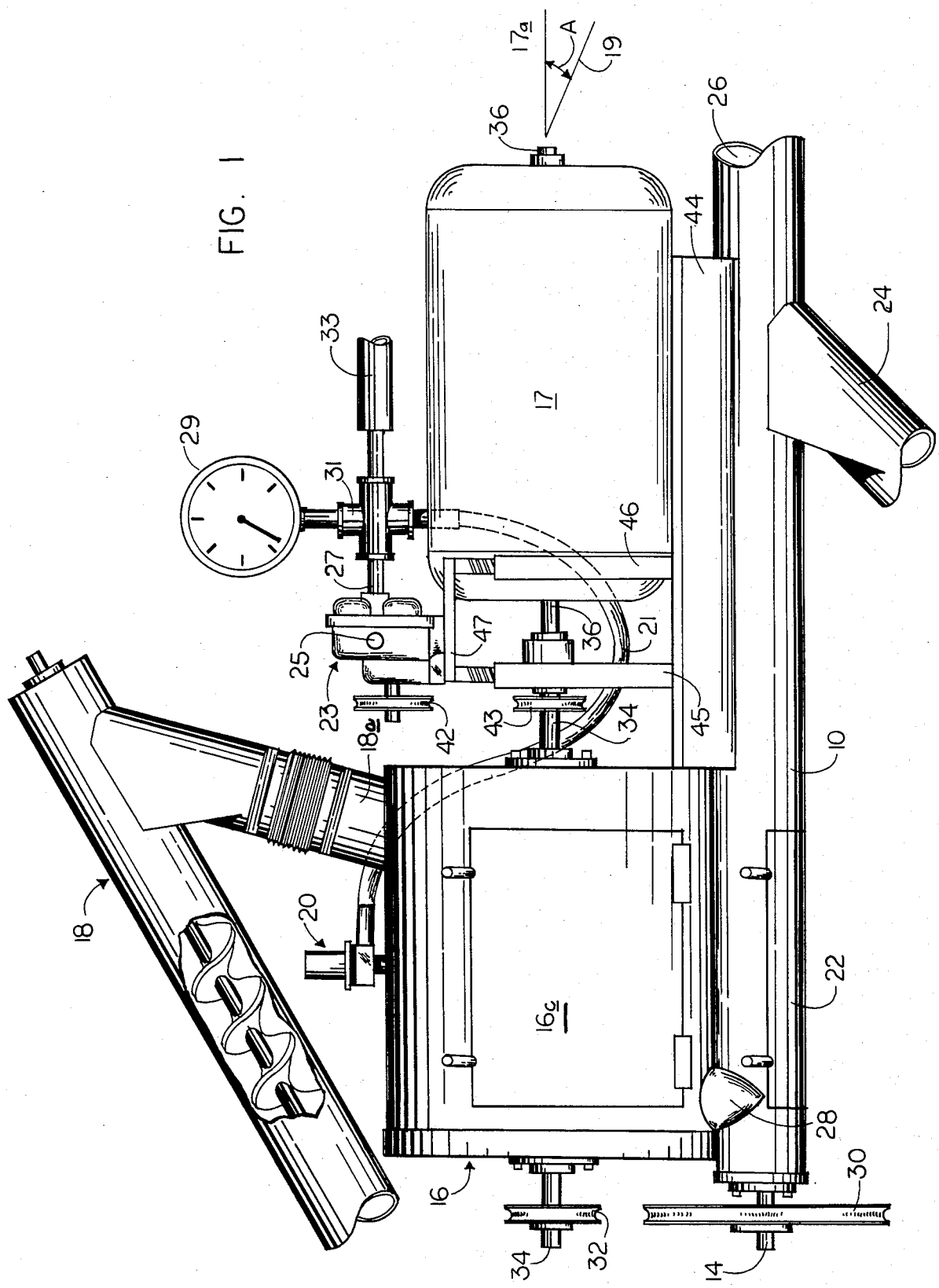
FIG. 1 is a side elevational view, partially cutaway, of the mixing apparatus of the invention.
Figure 2:
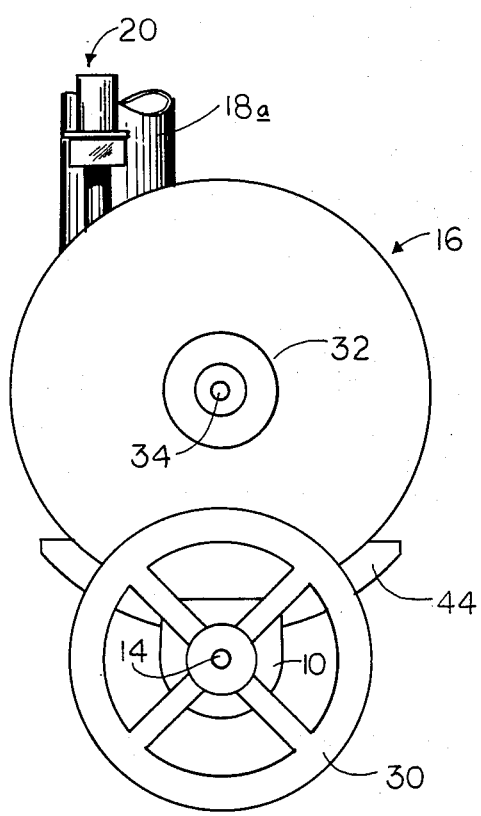
FIG. 2 is a top view of the mixing apparatus of the invention with the electric motor removed and the feed auger removed.
Figure 3:
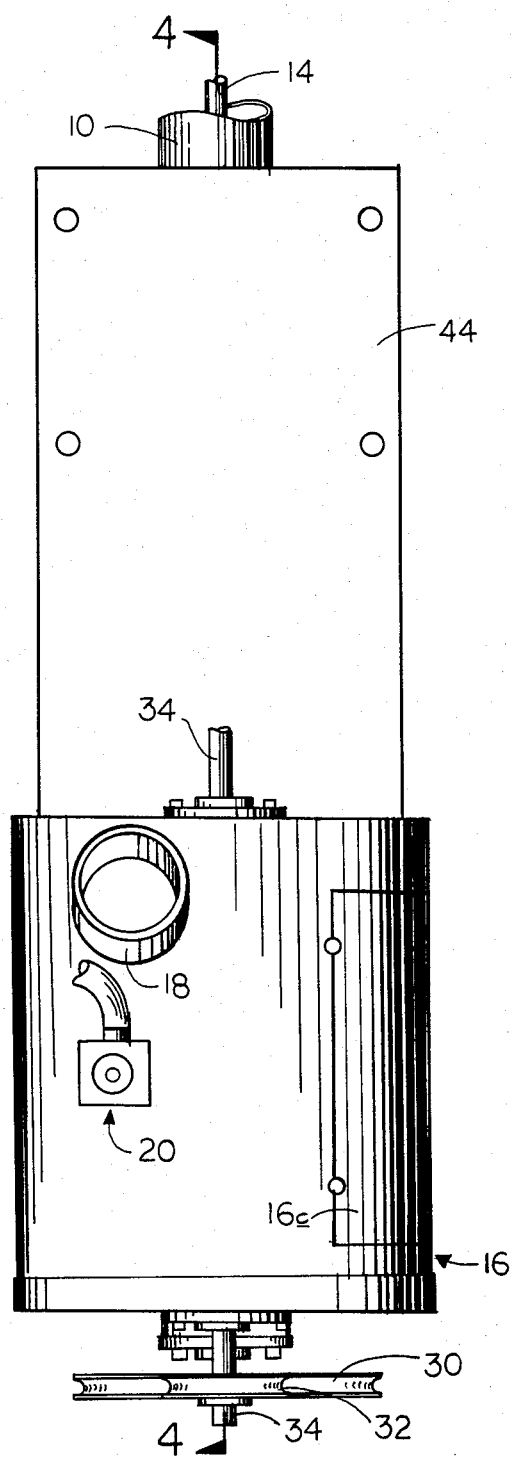
FIG. 3 is a front view of the mixing apparatus of the invention.

Referring now to the drawings, and in particular to FIG. 1, the mixing apparatus of the invention can be seen to be mounted on base 10. Base 10 is a metal cylinder enclosing the auger 12 shown in FIG. 4 having rotatable shaft 14. Mounted upon base 10 is blending chamber 16, a drive motor 17, a drive material feeding mechanism 18 and a syrup or molasses supply 20. Base 10 can be supported by legs (not shown) or other supports as desired.

Cylindrical base 10 has a access door 22 connected thereto for opening to clean syrup and grain from the auger 12 located in base 10. Base 10 also has a discharge chute 24 connected thereto which is normally claosed at the end but can be opened to sample the product being conveyed by the auger 12. Chute 24 can be closed by any conventional means such as a flat plate (not shown) or a flange (not shown). Base 10 has a discharge end 26 which can be connected to an additional pipe for conveying treated grain from the point at which it is treated to another bin. For example, an extension can be connected to discharge 26 and extended upwardly to the top of a large adjacent storage bin, fifteen to twenty feet or more higher as the grain is mixed, and grain can be continuously feed by auger 12 into the top of the adjacent storage bin.

Base 10 has an inlet 18a through which grain, which has been mixed with syrup in blending chamber 16, flows into base 10 and into contact with auger 12. Near inlet 18a is pulley 30 which drives shaft 14. Pulley 30 is connected to pulley 32 by a conventional, flexible belt drive (not shown). Pulley 32 is in turn connected to rotatable shaft 34 which is connected directly to the drive shaft 36 of drive motor 17.

Shaft 34 has rigidly connected thereto to mixing blades 38 and 39. Mixing blades 38 and 39 are preferably "U"-shaped as shown in the drawings. The mixing blades are located in the same plane and have two legs 38a, 38b, and 39a, 39b respectively, which are mounted at right angles to shaft 34. A cross member 38c and 39c connects the two legs and is parallel to shaft 34.

The legs and cross members are preferably oval or circular in cross section. Such an oval or circular configuration has been found to result in easier, more efficient mixing of feed and syrup, to prevent the feed and syrup from binding upon the blades, and to allow the feed to flow easily therearound. Legs 34 should extend to within a short distance of the curved outer wall of 16a of mixing chamber 16 so that material cannot build up on the wall without being scraped and agitated downwardly into auger inlet 28.

It is important that syrup supply 20 be located immediately above blade 39. Outlet 21a of syrup supply 20 flows syrup onto the grain or particulate matter that is being turned by blade 19. Thus the syrup is not allowed to flow onto particulate material which is stationary and on which the syrup could pile up in a large mass.

It is important that a space 40 be present in mixing chamber 16. Grain coming through chute 18a from the dry material feeding mechanism 18 can fall into space 40 without being agitated. Thus grain will stack up in space 40 and then come into contact with blade 39 and later blade 38 as grain moves toward inlet 28. Space 40 should be equal to about ½ to ⅓ of the volume of chamber 16, more preferably from about ½ to about ¼ of the volume of chamber 16.

Figure 4:
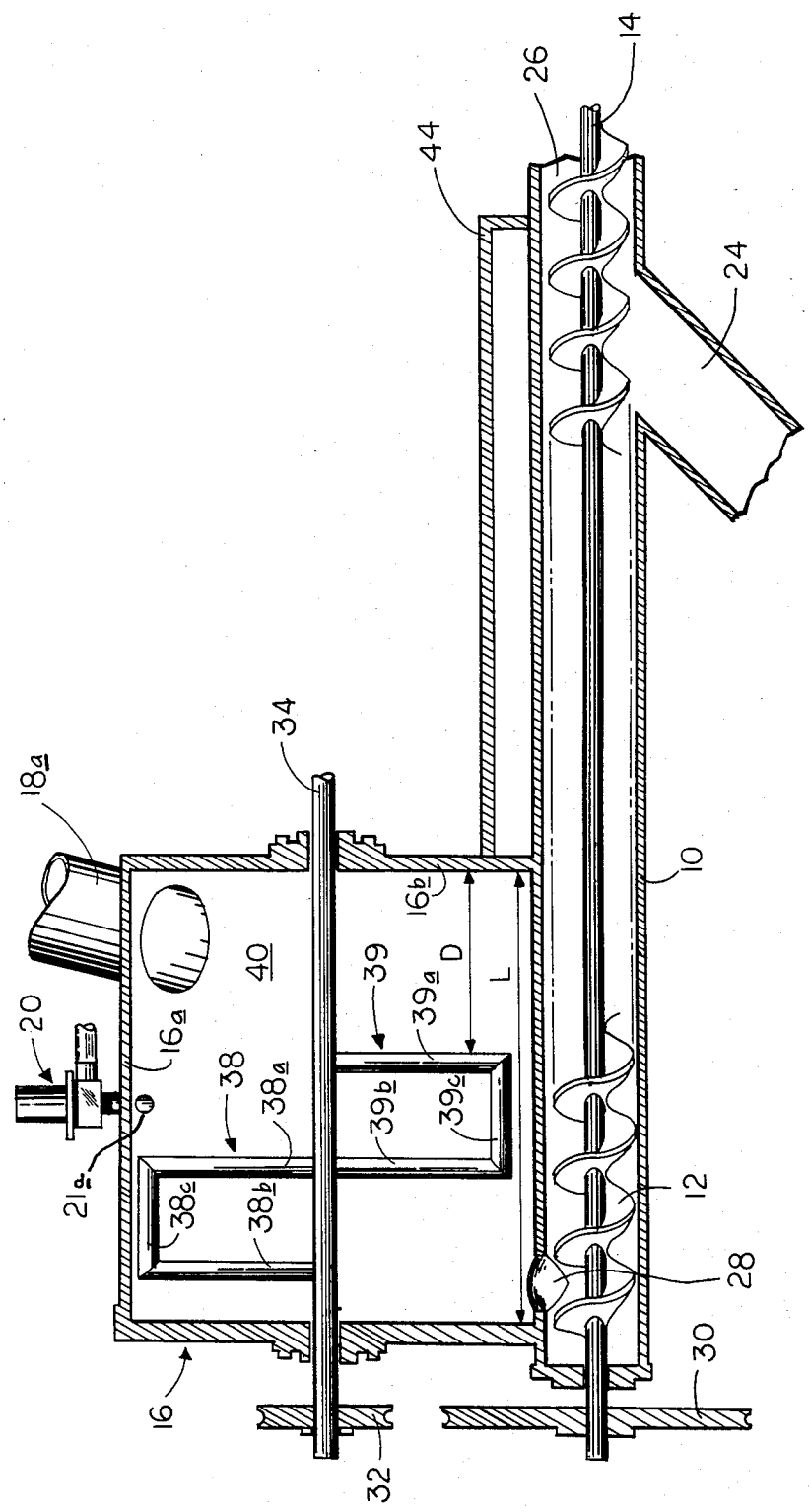
FIG. 4 is a partly sectional side view taken along lines 4—4 of FIG. 3.

The distance "D" shown in FIG. 4 between the edge of mixing blade 39 and the flat inside wall 16b of the end of chamber 16 closest to motor 17 is equal to from about ½ to about ⅓ of the total length "L" of the inside of the blending chamber 16, or more preferably from about ½ to about ¼ of the length "L" of the interior of mixing chamber 16.

In order to cause the grain or other feed material to move toward inlet 28 it is necessary that the apparatus of the invention be inclined at an acute angle "A" shown in FIG. 1 with the horizontal. In other words, the center line 17a of shaft 36 will be inclined upwardly at an angle "A" with the horizontal ground level indicated by the numeral 19. Angle "A" is preferably equal to from about 20 degrees to about 70 degrees and more preferably from about 30 degrees to about 60 degrees. Such angles will aid in causing the grain to flow toward inlet 28.

Syrup supply 20 is fed by line 21 which is in turn connected to pump 23. Pump 23 has an inlet 25 through which syrup is supplied thereto. Inlet 25 is connected to a reservoir of syrup which is not shown. Pump 23 has an outlet 27 to which is connected gauge 29 at the junction 31 of outlet 27 and line 21. An additional outlet 33 having a valve connected thereto which is not shown may be connected to junction 31 to divert the syrup to other sources or to allow the quality of the syrup to be checked while it is flowing into the following chamber 16.

Pump 23 is driven by pulley 42 which in turn is driven by pulley 43 to which it is connected by a conventional flexible drive belt (not shown). Pulley 43 is mounted on shaft 34 which is driven by electric motor 17.

Dry material feeding mechanism 18 as shown in FIG. 1 is a conventional feeding mechanism which is found to be associated with most large, dry grain bins and is not part of the apparatus of the invention. In place of the auger in 18 any other conventional means for feeding dry grain to blending chamber 16 through chute 18a could be utilized.

Motor 17 is connected to motor base 44 which is, in turn, connected by welding, bolting or the like to cylindrical base 10. Also connected to motor base 44 ae two legs 45 and 46 having a plate 47 connected thereto which supports syrup pump 23.

It thus can be seen from the foregoing description that the dry grain or particulate feed is fed into blending chamber 16 by dry material feeding mechanism 18 which in FIG. 1 is shown to be an auger which conveys feed to chute 18a wherefrom it drops into space 40 in blending chamber 16. As the feed builds up in space 40 in chamber 16 it will come into contact with blade 39 which is turning in blending chamber 16. The grain is aided in contacting blade 39 by the angle "A" at which the entire blending apparatus in shaft 34 is inclined relative to ground level or the horizontal.

As feed enters blending chamber 16, syrup is introduced in the chamber through 20 at a point directly over blade 39. Thus, as the grain is agitated by blade 39, it contacts fluids exiting from hole 21a and is covered therewith. Additional mixing continues as the grain with syrup thereon comes into contact with blade 38. After agitation by blade 38 the syrup covered grain exits through auger inlet 28 located at bottom of blending chamber 16. Blending chamber 16 also contains an access door 16c which can be opened to inspect and clean the machinery therein. Drive shaft 34 turns pulley 32 which in turns drives pulley 30 through a flexible drive belt (not shown) thereby causing shaft 14 and auger 12 to rotate. Grain entering base 10 through inlet 28 contacts the blades of auger 12 and is conveyed toward discharge outlet 26 where it can be conveyed to a bin or other storage facility.

Although the preferred embodiments of the present invention have been disclosed and described in detail above, it should be understood that the invention is in no sense limited thereby, and its scope is to be determined by that of the following claims.

What is claimed:

1. An apparatus for mixing particulate livestock feed with a viscous fluid such as syrup comprising:
    a. a hollow, inclined cylindrical mixing chamber having a higher end and a lower end for receiving feed and syrup through a feed inlet means and a syrup inlet means connected to the top of said mixing chamber, said feed inlet means being located at the higher end of said chamber, said mixing chamber being inclined at an angle of about 20° to about 70° with the horizontal,
    b. at least two mixing members connected to a rotatable shaft extending through and axially aligned with the centerline of said cylindrical mixing chamber, said mixing members being located on the lower end of said rotatable shaft extending through said mixing chamber, said mixing members extending from the lower end of said mixing chamber along said rotatable shaft for a distance of from about ½ to about ⅔ of the total length of the inside of said mixing chamber providing a space in the upper end of said mixing chamber into which dry grain can accumulate without being agitated by said mixing members, said syrup inlet means being located immediately above said mixing member located on the upper end of said rotatable shaft, said feed inlet means being located immediately above the upper portion of said rotatable shaft upon which there are no blades and said space in the upper end of said mixing chamber into which dry grain can accumulate without being agitated, c. a fluid pump for pumping syrup into said mixing chamber through said syrup inlet means, d. an outlet means connected to the bottom of said mixing chamber at the end of said chamber opposite from said feed inlet means, and e. an auger means located beneath said outlet means for conveying the mixture of feed and fluid discharged from said outlet means to a desired location.

2. The apparatus of claim 1 wherein said mixing members are "U"-shaped blades connected to said rotatable shaft, said blades having two parallel legs rigidly connected at right angles to said rotatable shaft, said two parallel legs being connected at their ends to a rigid cross member which is parallel to said rotatable shaft.

3. The apparatus of claim 2 wherein said legs and said cross member are oval in cross section.

4. The apparatus of claim 2 wherein said legs and said cross member are circular in cross section.

5. The apparatus of claim 2 wherein said mixing members lie in a plane.

6. The apparatus of claim 1 wherein said cylindrical mixing chamber comprises a cylinder closed at both ends.

7. The apparatus of claim 1 wherein said mixing members lie in a plane.

8. The apparatus of claim 1 wherein said mixing chamber is inclined at an angle of from about 30° to about 60°.

9. The apparatus of claim 1 wherein said mixing members extend from the lower end of said mixing chamber along said rotatable shaft for a distance of from about ½ to about ¼ of the total length of the inside of said mixing chamber.

* * * * *